US011182959B1

(12) United States Patent
Hwang

(10) Patent No.: US 11,182,959 B1
(45) Date of Patent: Nov. 23, 2021

(54) METHOD AND SYSTEM FOR PROVIDING WEB CONTENT IN VIRTUAL REALITY ENVIRONMENT

(71) Applicant: Piamond Corp., Busan (KR)

(72) Inventor: Doo Geon Hwang, Busan (KR)

(73) Assignee: PIAMOND CORP., Yeonje-gu (KR)

( * ) Notice: Subject to any disclaimer, the term of this patent is extended or adjusted under 35 U.S.C. 154(b) by 0 days.

(21) Appl. No.: 17/021,073

(22) Filed: Sep. 15, 2020

(30) Foreign Application Priority Data

Jun. 22, 2020 (KR) .................. 10-2020-0075917

(51) Int. Cl.
*G06T 19/00* (2011.01)
*G06T 19/20* (2011.01)
*G06F 16/957* (2019.01)
*G06F 16/958* (2019.01)

(52) U.S. Cl.
CPC .......... *G06T 19/003* (2013.01); *G06F 16/958* (2019.01); *G06F 16/9577* (2019.01); *G06T 19/00* (2013.01); *G06T 19/20* (2013.01)

(58) Field of Classification Search
CPC ................ G06T 19/00; G06T 19/20
See application file for complete search history.

(56) References Cited

U.S. PATENT DOCUMENTS

2016/0300392 A1\* 10/2016 Jonczyk .................. G06T 7/536
2018/0144556 A1\* 5/2018 Champion ........... G02B 27/017

FOREIGN PATENT DOCUMENTS

KR 10-2002-0007892 10/2003

\* cited by examiner

*Primary Examiner* — Matthew Salvucci
(74) *Attorney, Agent, or Firm* — Nixon Peabody LLP

(57) ABSTRACT

In rendering, on a virtual reality (VR) space, web content loaded from a publisher, after an object having a tangible characteristic is selected in the web content, an area for a user input is displayed as an area corresponding to a corresponding object with respect to each object.

10 Claims, 15 Drawing Sheets

- Real-world Person(using video call),
- Web Object
- Game Environment
- Streaming Channel / Content
- and etc

METHOD AND SYSTEM FOR PROVIDING WEB CONTENT IN VIRTUAL REALITY ENVIRONMENT

CROSS REFERENCE TO RELATED APPLICATION

This application claims priority under 35 U.S.C. § 119 to Korean Patent Application No. 10-2020-0075917 filed on Jun. 22, 2020, which is incorporated herein by reference in its entirety.

BACKGROUND OF THE INVENTION

1. Technical Field

The following description relates to a technology for providing web content in a virtual reality environment.

2. Description of the Related Art

In the existing browsing environment, each of a service provider that operates media for providing services and a third party service provider, that is, an external service provider, writes and uses information on users using its own cookies. For example, the third party service provider exposes information suitable for a user in real time through the media of the third party service provider using programmatic bidding or real-time bidding (RTB) based on information obtained through cookies.

However, in the case of a virtual space, there is a problem in that it is difficult for a third party service provider to effectively collect and check information of the experiences of a user because all the experiences of the user are performed in an environment focused on the supplier of a specific virtual space. Accordingly, in a conventional technology, the third party service provider merely exposes common information to an unspecified number of users regardless of the activities of users in a virtual space or merely provides related information to users based on information external to the activities of the users in a virtual space, such as the profile of a user.

PRIOR ART DOCUMENT NO

Korean Patent Application Laid-Open No. 10-2002-0007892

SUMMARY OF THE INVENTION

Embodiments provide a method and system capable of providing web content a virtual reality (VR) environment.

Embodiments provide a method and system capable of using web content in an individual object form not the concept of a window in a virtual reality environment.

In an aspect, a method performed by a computer device includes rendering, by at least one processor included in the computer device, web content loaded from a publisher on a virtual reality (VR) space, wherein rendering the web content includes selecting an object, having a tangible characteristic, in the web content, and displaying an area for a user input as an area corresponding to a corresponding object with respect to each object.

According to an aspect, selecting the object may include selecting the tangible object using a tag breakpoint for an individual object unit.

According to another aspect, selecting the object may include grouping objects related to the user input into a single object when the objects are contiguously present within neighbor areas.

According to still another aspect, displaying the area may include generating area information for the user input for each object and highlighting the area corresponding to the object based on the area information.

According to still another aspect, the method may further include providing, by the at least one processor, a focusing movement function within the area corresponding to the object.

According to still another aspect, providing the focusing movement function may include highlighting an object where an input focus of a user is located among the objects.

According to still another aspect, providing the focusing movement function may include moving the focus to a location corresponding to the input focus through auto-focusing in response to a movement of the input focus of the user.

According to still another aspect, providing the focusing movement function may include performing auto-focusing based on an individual object sequence on a code or an individual object location on cascading style sheets (CSS).

According to still another aspect, providing the focusing movement function may include performing auto-focusing using a metadata tag including a priority of an input to a tag to which a user input is possible.

In an aspect, there is provided a computer program stored in a computer-readable recording medium in order to execute the method in the computer device in association with the computer device.

In an aspect, there is provided a computer-readable recording medium in which a computer program for executing the method in a computer device is written.

In an aspect, a computer device includes at least one processor implemented to execute computer-readable instructions. The at least one processor is configured to render web content loaded from a publisher on a virtual reality (VR) space, select an object, having a tangible characteristic, in the web content, and display an area for a user input as an area corresponding to a corresponding object with respect to each object.

According to embodiments of the present disclosure, content on the web in a virtual reality environment can be provided in an individual object form.

DETAILED DESCRIPTION

Hereinafter, various embodiments of the present disclosure are described with reference to the accompanying drawings.

Figure 1:
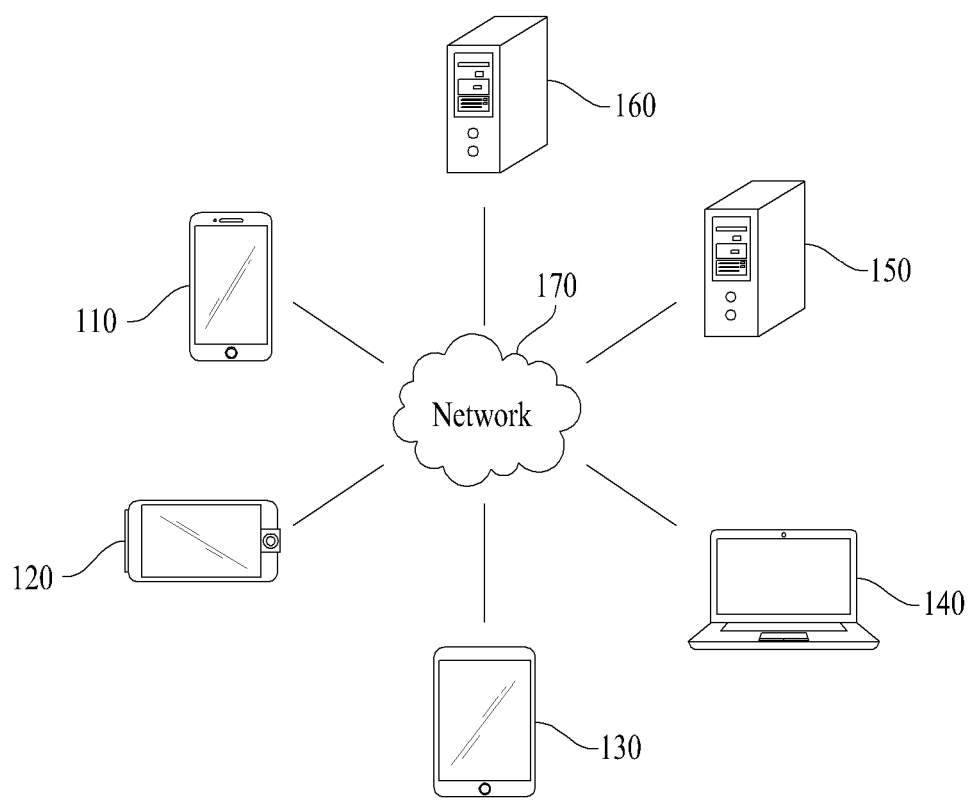
FIG. 1 is a diagram illustrating an example of a network environment according to an embodiment of the present disclosure.

FIG. 1 is a diagram illustrating an example of a network environment according to an embodiment of the present disclosure. FIG. 1 illustrates an example in which the network environment includes a plurality of electronic devices 110, 120, 130, and 140, a plurality of servers 150 and 160, and a network 170. The network environment of FIG. 1 is an example for the description of embodiments, and the number of electronic devices or the number of servers is not limited to those illustrated in FIG. 1. Furthermore, the network environment of FIG. 1 illustrates an example of environments which may be applied to the present embodiments, and an environment which may be applied to the present embodiments is not limited to the network environment of FIG. 1.

The plurality of electronic devices 110, 120, 130, and 140 may be stationary devices or mobile devices implemented as computer devices. The plurality of electronic devices 110, 120, 130, and 140 include a smartphone, a mobile phone, a navigation device, a computer, a laptop computer, a terminal for digital broadcasting, personal digital assistants (PDA), a portable multimedia player (PMP), a tablet PC, etc. In FIG. 1, a shape of a smartphone is illustrated as being an example of the electronic device 110. However, in embodiments of the present disclosure, the electronic device 110 may mean one of various physical computer devices capable of communicating with other electronic devices 120, 130 and 140 and/or the servers 150 and 160 over a network 170 substantially using a wireless or wired communication method.

A communication method is not limited, and may include short-distance wireless communication between devices in addition to communication methods using communication networks (e.g., a mobile communication network, wired Internet, wireless Internet and a broadcasting network) which may be included in the network 170. For example, the network 170 may include one or more given networks of a personal area network (PAN), a local area network (LAN), a campus area network (CAN), a metropolitan area network (MAN), a wide area network (WAN), a broadband network (BBN), and the Internet. Furthermore, the network 170 may include one or more of network topologies, including a bus network, a star network, a ring network, a mesh network, a star-bus network, and a tree or hierarchical network, but is not limited thereto.

Each of the servers 150 and 160 may be implemented as a computer device or a plurality of computer devices for providing instructions, code, files, contents, or services through communication with the plurality of electronic devices 110, 120, 130, and 140 over the network 170. For example, the server 150 may be a system that provides services (e.g., services based on a virtual space, an instant messaging service, a game service, a group call service (or voice conference service), a messaging service, a mail service, a social network service, a map service, a translation service, a financial service, a settlement service, a search service, and a content provision service).

Figure 2:
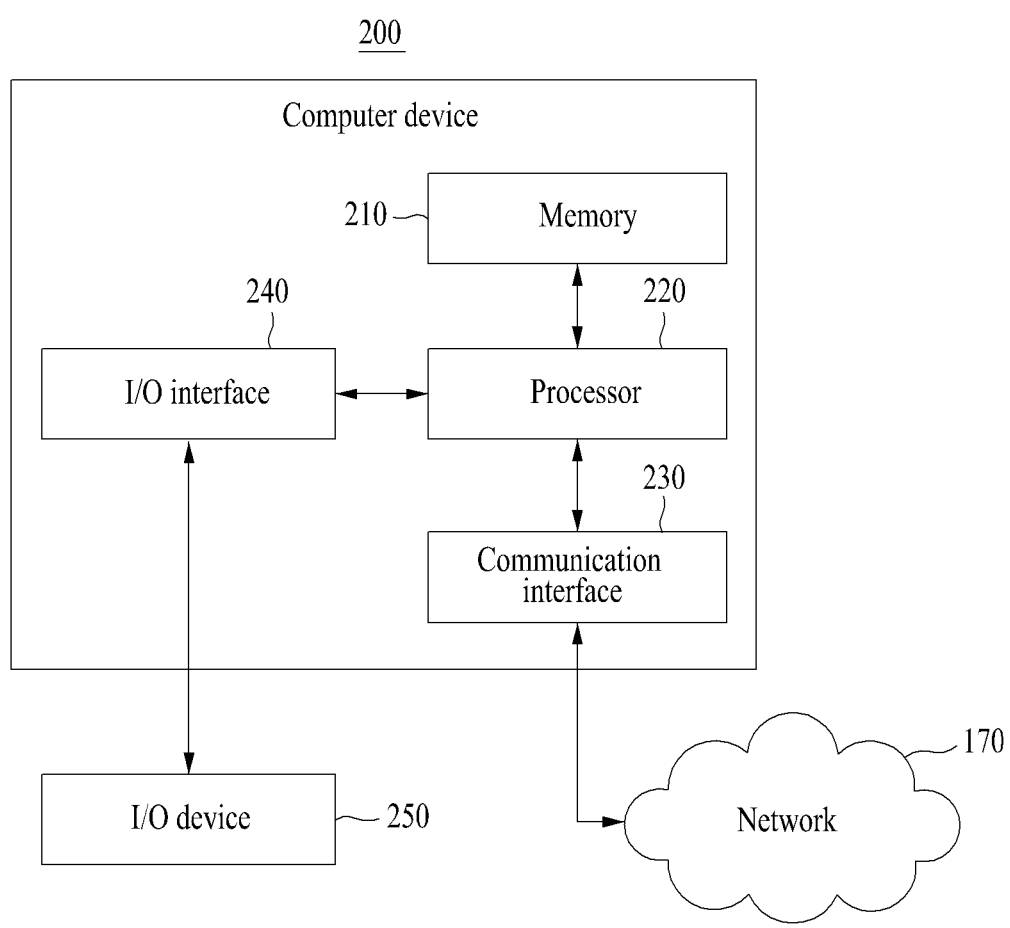
FIG. 2 is a block diagram illustrating an example of a computer device according to an embodiment of the present disclosure.

FIG. 2 is a block diagram illustrating an example of a computer device 200 according to an embodiment of the present disclosure. Each of the plurality of electronic devices 110, 120, 130, and 140 or each of the servers 150 and 160 may be implemented by the computer device 200 illustrated in FIG. 2.

As illustrated in FIG. 2, the computer device 200 may include a memory 210, a processor 220, a communication interface 230, and an input/output (I/O) interface 240. The memory 210 is a computer-readable recording medium, and may include permanent mass storage devices, such as a random access memory (RAM), a read only memory (ROM) and a disk drive. In this case, the permanent mass storage device, such as a ROM and a disk drive, may be included in the computer device 200 as a permanent storage device separated from the memory 210. Furthermore, an operating stem and at least one program code may be stored in the memory 210. Such software elements may be loaded from a computer-readable recording medium, separated from the memory 210, to the memory 210. Such a separate computer-readable recording medium may include computer-readable recording media, such as a floppy drive, a disk, a tape, a DVD/CD-ROM drive, and a memory card. In another embodiment, software elements may be loaded onto the memory 210 through the communication interface 230 not a computer-readable recording medium. For example, the software elements may be loaded onto the memory 210 of the computer device 200 based on a computer program installed by files received over the network 170.

The processor 220 may be configured to process instructions of a computer program by performing basic arithmetic, logic and I/O operations. The instructions may be provided to the processor 220 by the memory 210 or the communication interface 230. For example, the processor 220 may be configured to execute instructions received according to program code stored in a recording device, such as the memory 210.

The communication interface 230 may provide a function for enabling the computer device 200 to communicate with other devices over the network 170. For example, a request, a command, data or a file generated by the processor 220 of the computer device 200 based on program code stored in a recording device, such as the memory 210, may be provided to other devices over the network 170 under the control of the communication interface 230. Inversely, a signal, a command, data or a file from another device may be received by the computer device 200 through the communication interface 230 of the computer device 200 over the network 170. A signal, a command or a file received through the communication interface 230 may be transmitted to the processor 220 or the memory 210. A file received through the communication interface 230 may be stored in a storage device (the aforementioned permanent storage device) which may be further included in the computer device 200.

The I/O interface 240 may be means for an interface with an input/output (I/O) device 250. For example, the input device may include a device, such as a microphone, a keyboard, a camera or a mouse. The output device may include a device, such as a display or a speaker. For another example, the I/O interface 240 may be means for an interface with a device in which functions for input and output have been integrated into one, such as a touch screen. At least one of the I/O devices 250, together with the computer device 200, may be configured as a single device. For example, the I/O device 250 may be implemented in a form in which a touch screen, a microphone, a speaker, etc. are included in the computer device 200, like a smartphone.

Furthermore, in other embodiments, the computer device 200 may include elements greater or smaller than the elements of FIG. 2. However, it is not necessary to clearly illustrate most of conventional elements. For example, the computer device 200 may be implemented to include at least some of the I/O devices 250 or may further include other elements, such as a transceiver and a database.

Figure 3:
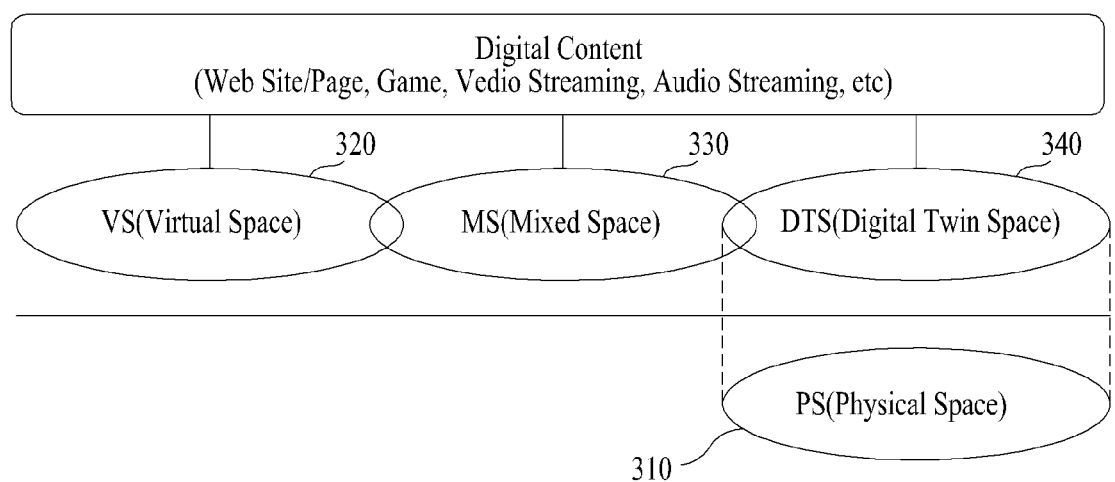
FIG. 3 is a diagram for describing spaces according to an embodiment of the present disclosure.

FIG. 3 is a diagram for describing spaces according to an embodiment of the present disclosure. FIG. 3 illustrates a physical space (PS) 310, that is, a space in the real world, and a virtual space (VS) 320, a mixed space (MS) 330 and a digital twin space (DTS) 340, that is, spaces in a virtual world.

The space in the virtual world may be designed by a supplier (i.e., service provider) of the virtual world or may be configured by a user or a third party service provider, that is, an external service provider. The space in the virtual world may be configured in the form of the VS 320, the MS 330 and/or the DTS 340 depending on a feature of the space. The VS 320 may be a pure digital-based space which may be associated with a cyber physical system (CPS). The DTS 340 may be a space is a real world-based virtual space and associated with the CPS. The MS 330 may be a space in which the VS 320 and the DTS 340 are mixed. The MS 330 may be provided in a form in which an agent, that is, the object of a user, is adaptive to an environment of the real world or may be provided in a form in which an environment of the real world is rendered on the virtual world.

The space in the virtual world is a concept of a basic virtual space where the agent of a user may behave. A policy for the activity, information utilization and/or exposure of an agent may be present for each space. If the agent of a user uses services in a specific space in a virtual world, the user needs to recognize that each piece of personal information and privacy & terms are present depending on the subject of service provision.

The space in the virtual world may be variously generated and used depending on a supplier or a user. To this end, a separate gate may be provided as an interface for a movement of an agent between spaces in the virtual world.

Figure 4:
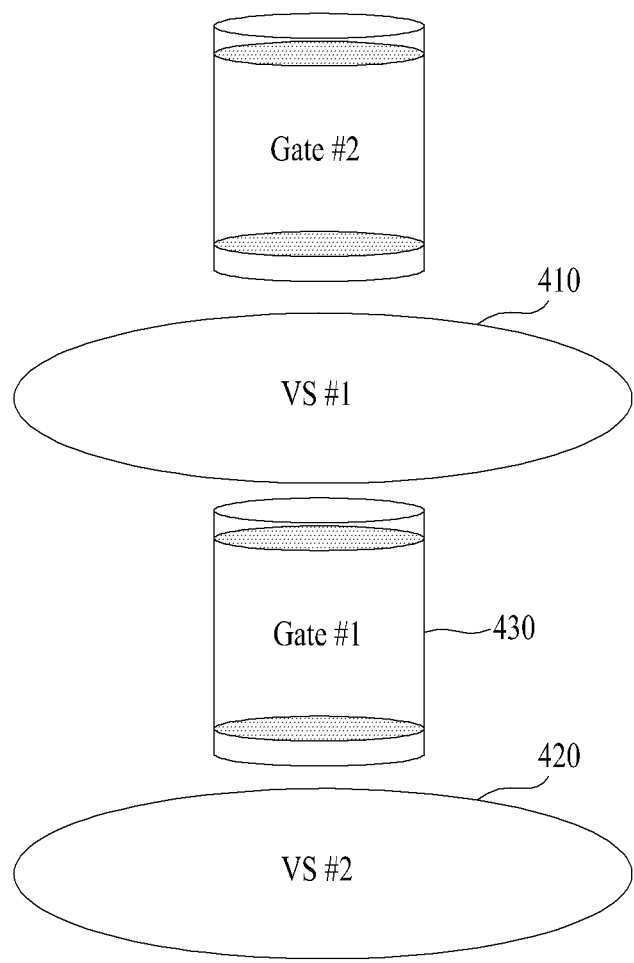
FIG. 4 is a diagram illustrating an example of a movement between spaces in a virtual world according to an embodiment of the present disclosure.

FIG. 4 is a diagram illustrating an example of a movement between spaces in the virtual world according to an embodiment of the present disclosure. FIG. 4 illustrates a gate #1 430 for a movement between a VS #1 410 and a VS #2 420, that is, two virtual spaces. In this case, the gate may be a basic interface for providing a movement between spaces in the virtual world. The gate may also control a movement between a space in the virtual world and a space in a non-virtual world, in addition to a movement between spaces in the virtual world. For example, FIG. 4 illustrates that the agent of the VS #1 410 may also move to a movement target as a space in a non-virtual world, such as a web page, a streaming channel, streaming content, a game environment, or an actual offline video call. A method of distinguishing between spaces in the virtual world may be determined by the supplier of a space in the virtual world.

The agent may mean a user or program in the space in the virtual world. In this case, an agent as a program has a form of an artificial intelligence agent, and may be a virtual avatar or persona present in place of a third party service provider. A physical characteristic of a space in the virtual world to which an agent belongs may be applied to the corresponding agent. A service profile set for the space in the virtual world may be applied to the agent. Furthermore, the agent may have a characteristic based on information of a physical device used by a user. For example, the agent may have a viewing angle based on a display characteristic of a physical device used by a user or may have a control characteristic based on the controller of the corresponding physical device.

Furthermore, a digital object to be described hereinafter is a core element that configures world information in a space in the virtual world, and may collectively refer to objects that provide a mutual interaction function with an agent.

Figure 5:
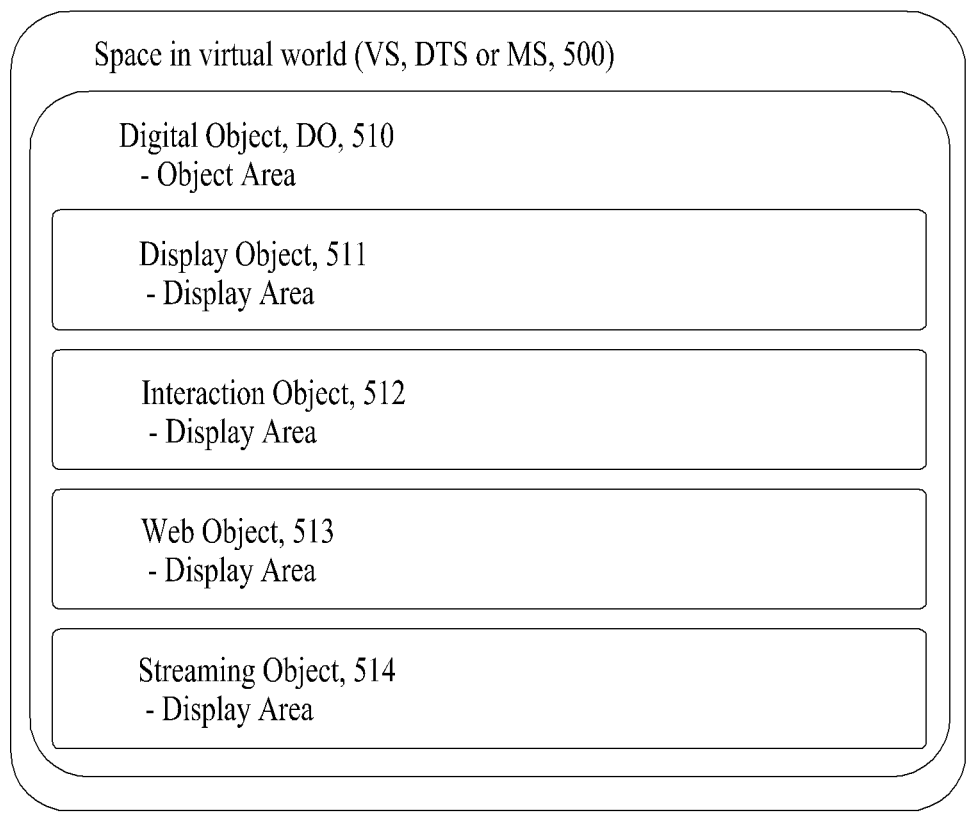
FIG. 5 is a diagram illustrating a relation between elements configuring a space in a virtual world according to an embodiment of the present disclosure.
Figure 6:
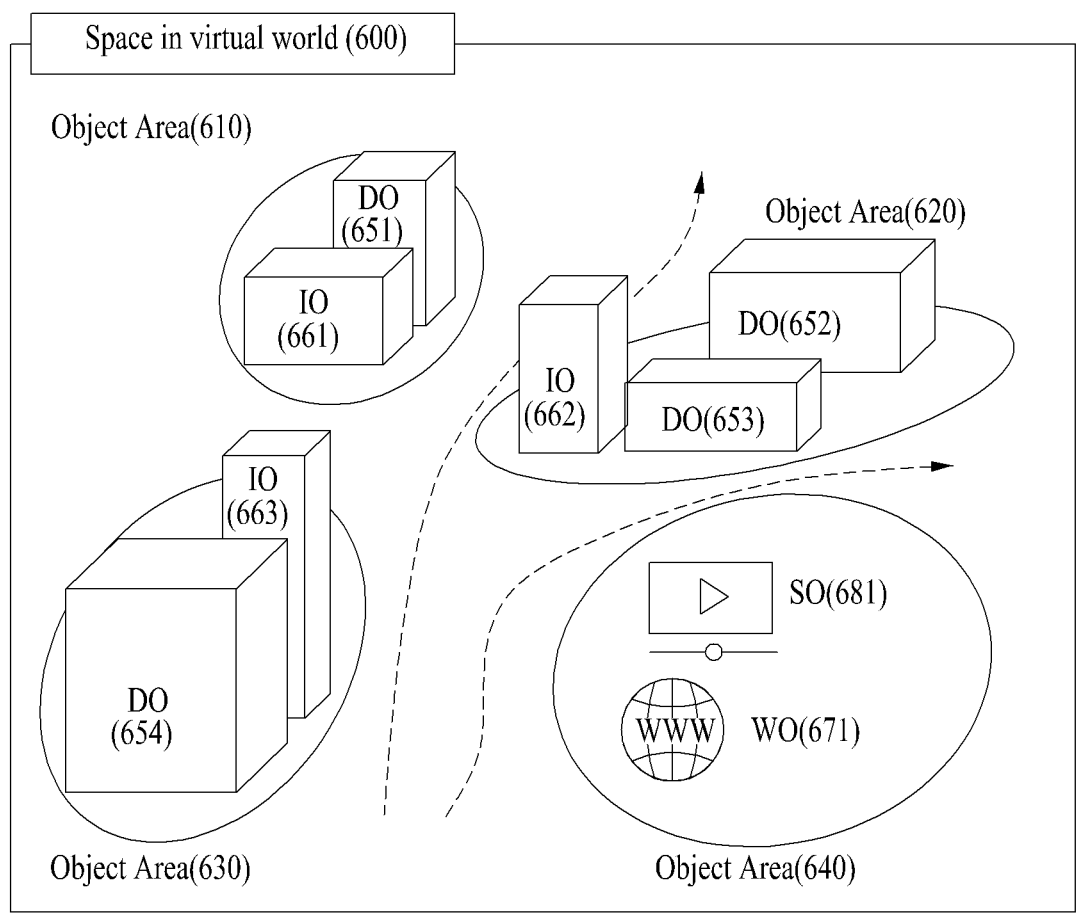
FIG. 6 is a diagram illustrating an example in which a digital object is configured in a space in a virtual world according to an embodiment of the present disclosure.

FIG. 5 is a diagram illustrating a relation between elements configuring a space in a virtual world according to an embodiment of the present disclosure. FIG. 6 is a diagram illustrating an example in which a digital object is configured in a space in a virtual world according to an embodiment of the present disclosure.

FIG. 5 illustrates that a space 500 in a virtual world, such as the VS 320, the MS 330 and/or the DTS 340 described with reference to FIG. 3, may include a digital object 510. In this case, the digital object 510 may be formed in an object area (OA), that is, an area including the space 500 in the virtual world. Furthermore, the digital object 510 may include a display object (DO) 511, an interaction object (IO) 512, a web object (WO) 513, and a streaming object (SO) 514. Each of the DO 511, the IO 512, the WO 513, and the SO 514 may optionally include a display area for the display of content.

FIG. 6 illustrates an example in which digital objects are deployed in OAs 610 to 640 formed in a space 600 in a virtual world. In this case, the digital objects may include DOs 651 to 654, that is, display objects, IOs 661 to 663, that is, interaction objects, a WO 671, that is, a web object, and/or an SO 681, that is, a streaming object. Each of dotted-line arrows 691 and 692 illustrated in FIG. 6 illustrates an example of a traffic line along which an agent may move.

As in the example of FIG. 6, according to an embodiment of the present disclosure, digital objects having various forms may be present in the space in the virtual world. Each of the digital objects may be generated based on an agent according to predetermined conditions. In this case, the digital object may be generated on the object area. If the space in the virtual world simulates the real world like a DTS (e.g., the DTS 340 in FIG. 3), the location of the object area may be determined based on a predetermined physical location of the real world. For example, if a specific shopping mall, a historic site, etc. in the real world is virtualized, the location of an object area may be determined to have the same configuration as an actual location.

The display object (DO) may be an object exposed to the space in the virtual world in a spatial form (or structural form), and may provide a simple control function to an agent. The interactive object (IO) may be exposed to the space in the virtual world in a spatial form, and may be an object having an interactive feature and capable of interacting with an agent. For example, the IO may provide various interaction features with an agent. Furthermore, the web object (WO) may be an object having a form in which content on the web is exposed through the space in the virtual world. Furthermore, the streaming object (SO) may be an object having a form in which streaming content, such as video or audio, can be continuously exposed.

The OA may have a spatial feature capable of generating a digital object, that is, a virtual object, in the space in the virtual world. The digital object present on the OA may basically have the following functions. Whether to provide each of the functions may be determined based on a contract between the owner of the digital object and the supplier of the space in the virtual world.

1. Agent Association-Related Function

1) Interaction function: a function for providing an interface which can be directly controlled by an agent 2) History function: a function capable of tracking and storing information related to the visit and interaction of an agent 3) Interest information storage (favorite/like) function: a function capable of storing information of a digital object interested by an agent 4) Follow me function: a function of making a digital object on the OA follow around an agent by making the digital object small windows or an icon 2. External API Association-Related Function 1) Function capable of sharing information on timing at which a digital object is generated and terminated in the space in the virtual world 2) Interface function for providing, to the outside, agent-related information collected by digital objects on the OA 3) Interface function for representing information on the DO or the IO by incorporating real world information (e.g., a function for representing information, such as order waiting in an actual store, congestion within a store, or a parking condition)

3. Gate Association-Related Function

1) Gate connection function: a function for connecting an agent to another VS or PS in a digital object present on the OA 4. Display Area (DA)-Related Function 1) DA function: this is an area where content may be exposed by the owner of a digital object depending on the owner's intention, and may be exposed to an agent.

2) Display content request function: a function capable of receiving external content through a real world content control module A DO and an IO are some of elements that configure the space in the virtual world, and may be present on the object area (OA). The DO and the IO basically appear in a form in which they are displayed on a screen of a user, and may have characteristics of a structure having a given standard. External information of the DO may be provided from the owner of the DO to the supplier of the space in the virtual world or may be directly designed using a template provided by a supplier or a preset tool. Furthermore, each of the DO and the IO may have a display area (DA) which may be directly controlled by an owner. Content exposed in the DA may be provided based on a selection of the owner of the DO and/or the IO within a proper range based on a policy between the owner of the DO and/or the IO and the supplier of the space. The DA may individually have an exposure feature (e.g., perspective or a feature for highlighting regardless of perspective) based on a viewing angle of an agent and an interaction feature. Furthermore, each IO may have interactive features which may be directly controlled by the owner of the IO. The IO may provide an interaction suitable for a situation of an agent based on interaction feature activation information of the agent. For example, if a user wears only a head mounted display (HMD), the IO may provide an operation function having the same form as the DO. In contrast, if a user has a controller coupled to an HDM, the IP may provide an interaction feature (e.g., grabbing or pulling or drawing) with an agent, which is provided in a corresponding space in the virtual world. For another example, if a user has an additional motion recognition controller, a corresponding feature may be used for the IO. The DO may have basic control features. Such basic control features may include a basic control function of the space in the virtual world, which is has been set by a supplier. For example, the basic control function may include history setting and/or interest information setting.

Figure 7:
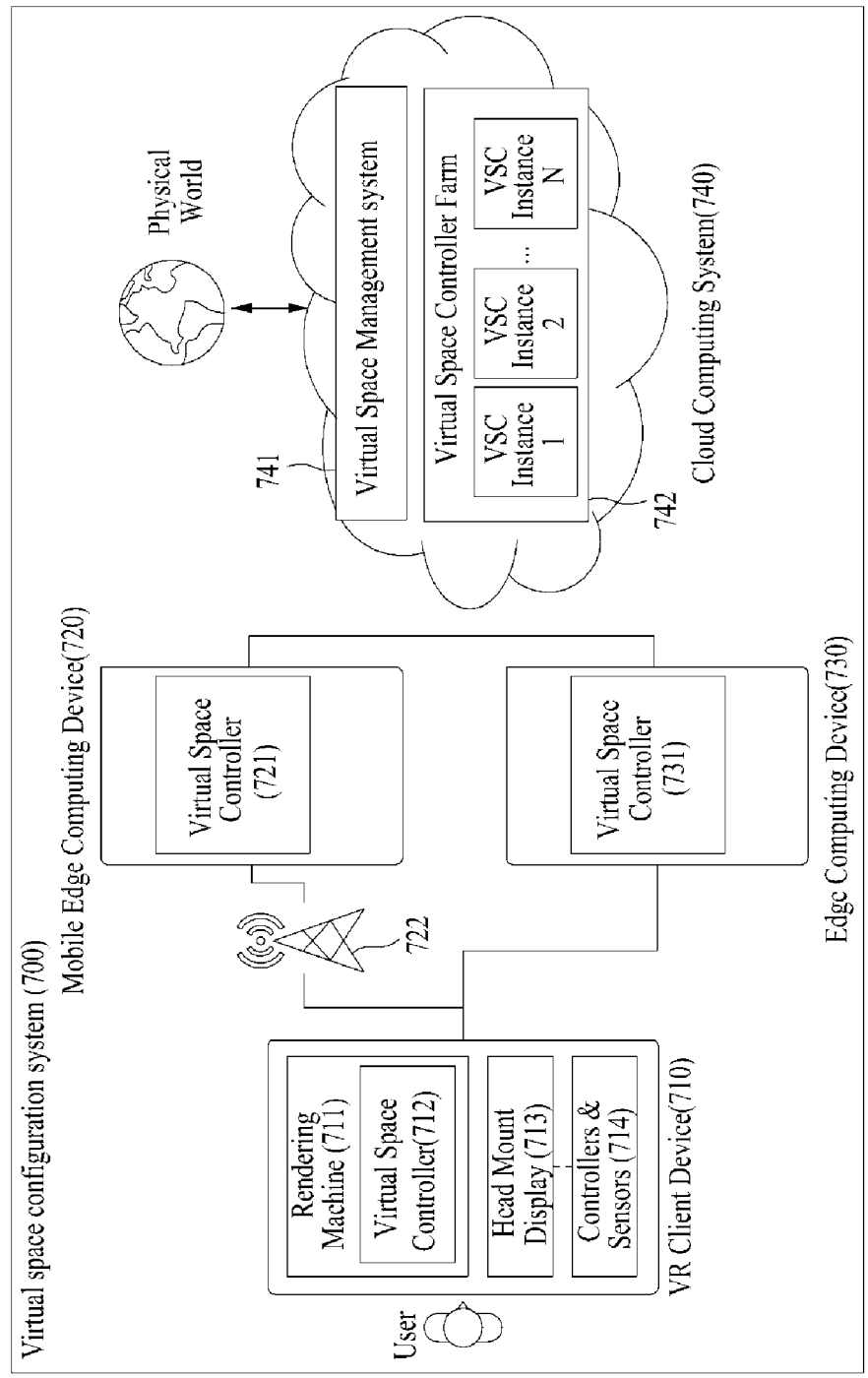
FIG. 7 is a diagram illustrating a schematic form of a virtual space configuration system according to an embodiment of the present disclosure.

FIG. 7 is a diagram illustrating a schematic form of a virtual space configuration system 700 according to an embodiment of the present disclosure. In FIG. 7, the virtual space configuration system 700 may include a virtual reality (VR) client device 710, a mobile edge computing device 720, an edge computing device 730, and a cloud computing system 740. Each of the VR client device 710, the mobile edge computing device 720, the edge computing device 730, and the cloud computing system 740 may be implemented through the computer device 200 described with reference to FIG. 2. It can be easily understood that the cloud computing system 740 may be implemented by two or more computer devices 200.

The VR client device 710 may be a physical device for displaying a space in a virtual world to a user. As illustrated in FIG. 7, the VR client device 710 may include a rendering machine 711. The rendering machine 711 may include a virtual space controller (VSC) 712, a head mount display (HMD) 713, and controllers & sensors 714. The rendering machine 711 may display a space in the virtual world on the HMD 713 through the VSC 712. An output value of the controllers & sensors 714 may be used to control the agent of a user in the space in the virtual world and/or to interact with digital objects deployed in the space in the virtual world.

In some embodiments, the VSC 712 may not be directly included in the VR client device 710 or the rendering machine 711, but may be included in the mobile edge computing device 720 or the edge computing device 730. For example, if the VR client device 710 of a user is a device capable of directly rendering a space in a virtual world, the space in the virtual world may be rendered using the VSC 712 of the VR client device 710. In contrast, if the VR client device 710 of a user cannot directly render a space in a virtual world, the VR client device 710 may render the space in the virtual world through the VSC 721 of the mobile edge computing device 720 wirelessly connected to the VR client device 710 through an access point 722 or through the VSC 731 of the edge computing device 730 connected to the VR client device 710 in a wired manner, and may display the rendered space on the HMD 713. If both the mobile edge computing device 720 and the edge computing device 730 are not supported, as will be described later, the space in the virtual world may be rendered using a VSC farm 742 included in the cloud computing system 740. The VSC farm 742 may generate an instance of a VSC for a user, and may support that the user displays a rendered space in a virtual world on the HMD 713. In this case, the VSCs 712, 721 and 731 may be VSC instances that are generated and provided through the VSC farm 742 by the cloud computing system 740.

The VSCs 712, 721 and 731 may render a space in a virtual world so that content delivered in relation to the display area of a digital object is displayed in the space in the virtual world for an agent. The cloud computing system 740 that configures a space in a virtual world and provides services may generate the VSCs 712, 721 and 731 for the VR client device 710 of a user corresponding to an agent. The VSCs 712, 721 and 731 may be launched into at least one of the VR client device 710, the mobile edge computing device 720, the edge computing device 730 or the cloud computing system 740, and may support the rendering of a space in a virtual world for the VR client device 710.

The VR client device 710 may be directly connected to the cloud computing system 740 or connected to the cloud computing system 740 through the mobile edge computing device 720 or the edge computing device 730, and may be supplied with services related to a space in a virtual world.

The cloud computing system 740 may be a system of a service provider for configuring a space in a virtual world and providing a user with services related to the space in the virtual world. As illustrated in FIG. 7, the cloud computing system 740 may include a virtual space management system 741 and a VSC farm 742. The VSC farm 742 may be implemented in a form included in the virtual space management system 741. The virtual space management system 741 more specifically described with reference to FIG. 8.

Figure 8:
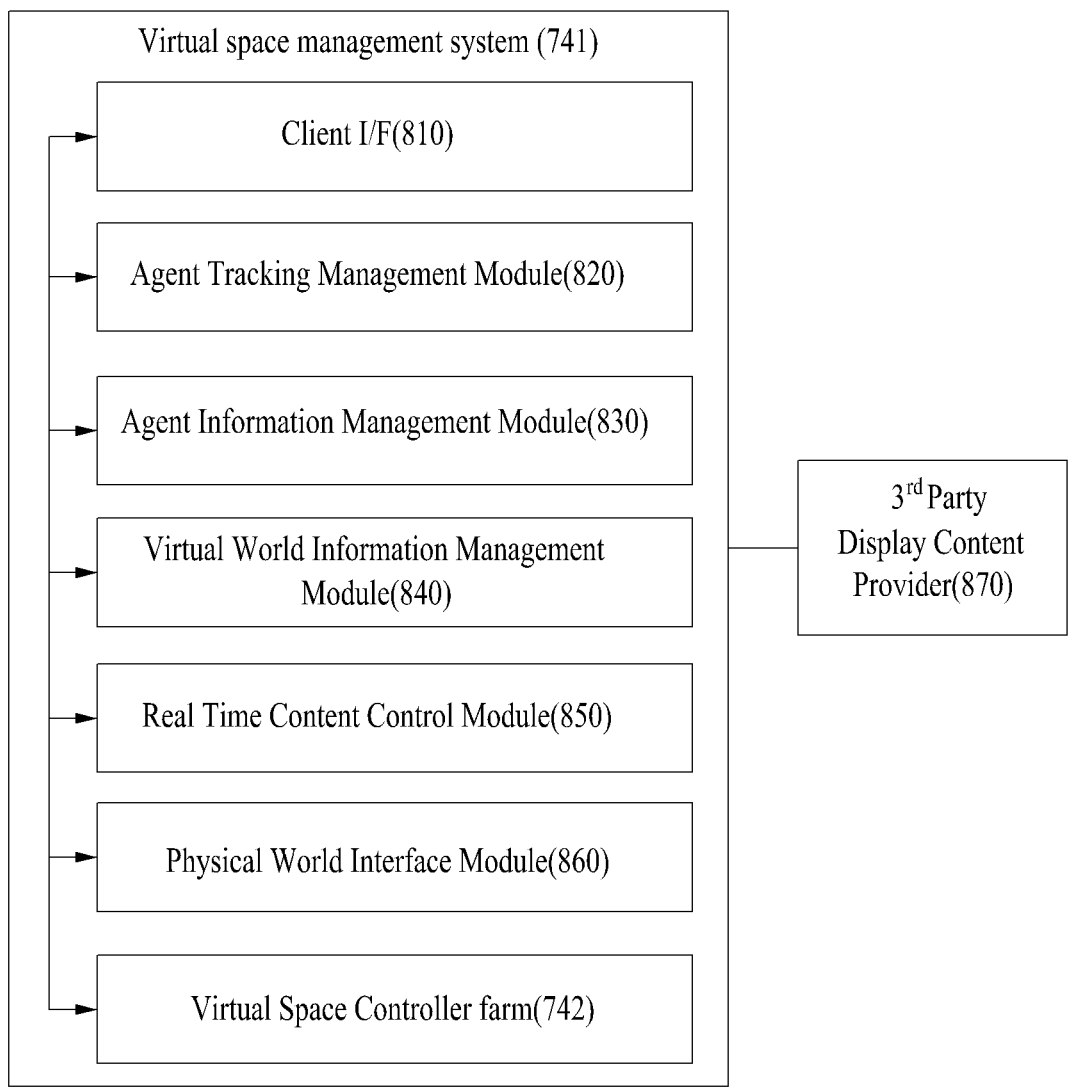
FIG. 8 is a block diagram illustrating an example of internal elements of a virtual space management system according to an embodiment of the present disclosure.

FIG. 8 is a block diagram illustrating an example of internal elements of the virtual space management system 741 according to an embodiment of the present disclosure. As illustrated in FIG. 8, the virtual space management system 741 according to the present embodiment may include a client interface (I/F) 810, an agent tracking management module 820, an agent information management module 830, a virtual world information management module 840, a real-time content control module 850, a physical world interface module 860, and a VSC farm 742. The elements of the virtual space management system 741 may be functional expressions of the processor 220 included in at least one computer device 200 that implements the cloud computing system 740.

The client I/F 810 may provide a user interface for the VR client device 710. For example, the client I/F 810 may provide various user interfaces through which a user can interact with a space in a virtual world in a process in which the user is provided with services for the space in the virtual world, which is provided by the cloud computing system 740, using the VR client device 710.

The agent tracking management module 820 may track an agent deployed and moved in a space in a virtual world. Information obtained as the agent is tracked may be stored in a tracking database (DB) in real time in associated with the identifier (ID) of the agent. Tracking history information for the agent may be stored in a tracking history DB in association with the ID of the agent.

The agent information management module 830 may store the profile of an agent and the consent of the agent. For example, the agent information management module 830 may store the profile of the agent in an agent profile DB in association with the ID of the agent, and may store the consent contents of the agent in an agent consent DB in association with the ID of the agent. In this case, the consent may include personal information and consent to privacy & terms.

The virtual world information management module 840 may manage information on a space in a virtual world. For example, the virtual world information management module 840 may store information on the policy of the space in the virtual world, virtual map information, information on the location of the space in the virtual world (e.g., GPS information for the space in the virtual world), information on digital objects deployed in the space in the virtual world, etc., and may provide corresponding information in response to a request from another module.

The real-time content control module 850 may select content to be displayed in a space in a virtual world. For example, the real-time content control module 850 may select content to be displayed in the display area of a digital object, which is configured within the space in the virtual world. To this end, the real-time content control module 850 may include a function for content bidding and a function for selecting content to be displayed. For example, the real-time content control module 850 may select content to be displayed in a display area based on the bidding of a third party display content provider 870.

The physical world interface module 860 may provide a function for controlling a physical resource and an interface for physical resources.

As described above, the VSC farm 742 may generate, provide and manage an instance of the VSC in order to help the rendering of the VR client device 710.

The virtual space management system 741 may receive HMD information and control/sensor information from the VR client device 710. The HMD information may include device motion tracking information of degrees of freedom (3-DoF) or 6-DoF. The device motion tracking information may include motion tracking information for the VR client device 710. Furthermore, the HMD information may include user information from the VR client device 710. For example, the user information may include the rotation of the head of a user, a motion of the body of the user, and eye-gaze information of the user. Furthermore, the HMD information may include rendering-related information, such as rendering delay or temperature. Control/sensor information may include information on a motion of the body of a user or real-time controller information, such as a key event or a movement.

A detailed embodiment of a method and system for providing web content in a VR environment is described below.

In the VR environment, users consume contents on the web individually or several users consume content on the web simultaneously. In this case, there is a need for a method for using the content in the form of an individual object not a concept of a window.

The web object (WO) 513 or 671 may be an object having a form in which content on the web is exposed through a space in a virtual world. The WO is an object which may be classified based on the existing web content, and may be configured with text, an image, and playable content (e.g., video or audio).

A tag breakpoint for an individual object unit may be used for classification criteria for the WO. An individual object may be classified based on a style, such as <div>, or a HTML tag, such as <img>, <video>, or <table>.

A tag corresponding to an individual object has a tangible characteristic, and may use a basic interface (e.g., object area) provided in VR services or a third party tangible characteristic intended by a content producer. A control interface or an interface based on an output or playback may be provided depending on characteristics of each object for each object.

Figure 9:
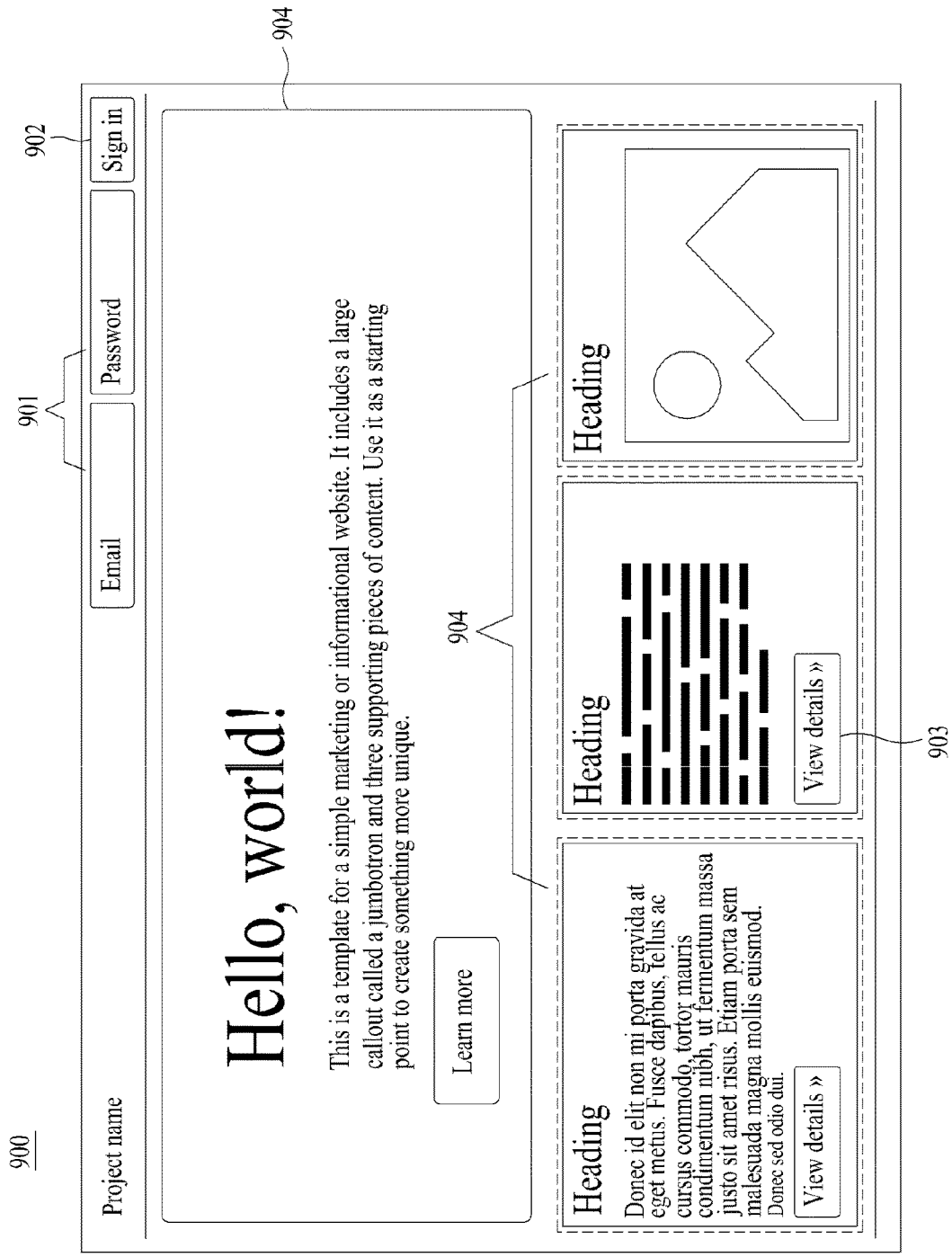
FIG. 9 illustrates an example of web content according to an embodiment of the present disclosure.

FIG. 9 illustrates an example of web content 900, such as content written as a HTML tag.

The web content 900 may be classified as an individual object using a <div> tag. As illustrated in FIG. 9, the web content 900 may include a user input object 901, an input button object 902, and a hyperlink 903 classified based on a criterion <tag>, and may include a content object 904 classified based on a criterion <div id> or <class>.

Figure 10:
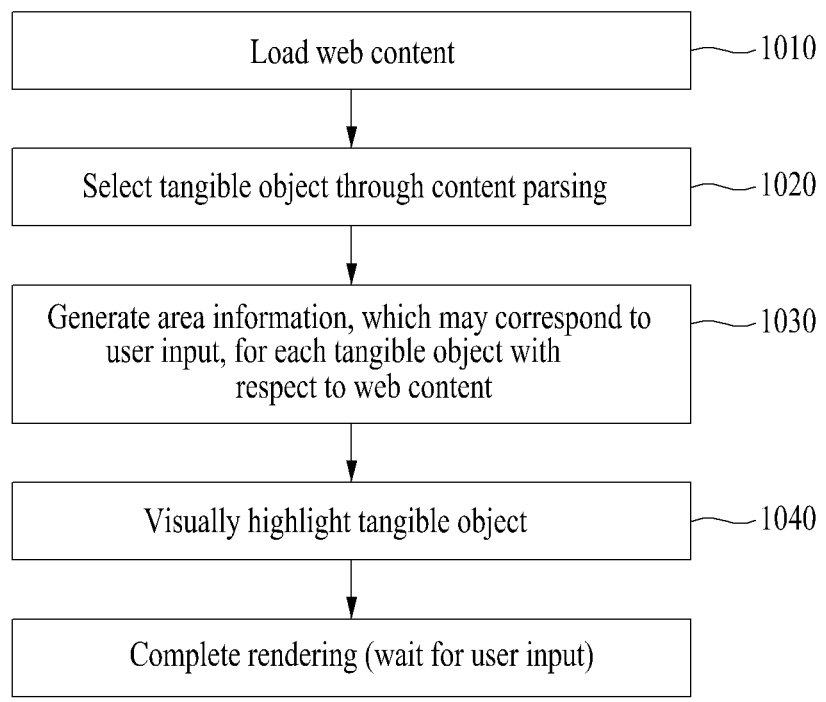
FIG. 10 is a flowchart illustrating an example of a process of recognizing a tangible object for web content according to an embodiment of the present disclosure.

FIG. 10 is a flowchart illustrating an example of a process of recognizing a tangible object for web content according to an embodiment of the present disclosure. The process of recognizing a tangible object according to the present embodiment may be performed by the computer device 200 that implements a device capable of rendering a space in a virtual world (corresponding to the VR client device 710, the mobile edge computing device 720 or the edge computing device 730 described with reference to FIG. 7).

At step 1010, the computer device 200 loads, from a publisher (e.g., the servers 150 and 160), web content to be exposed through a VR space.

At step 1020, the computer device 200 selects an object having a tangible characteristic, that is, a tangible object, by parsing the web content loaded at step 1010.

Figure 11:
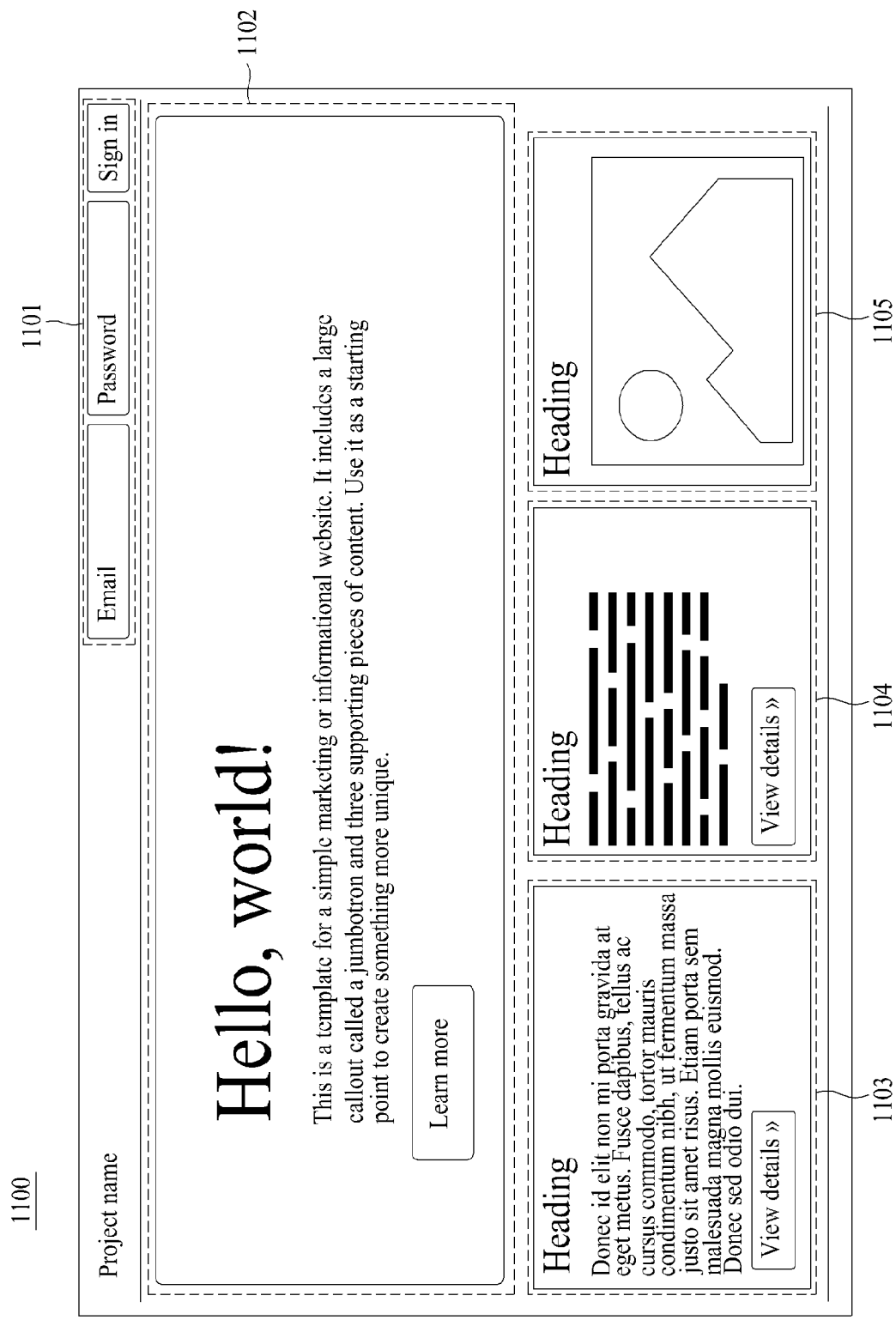
FIG. 11 illustrates an example of a tangible object for web content according to an embodiment of the present disclosure.

Referring to FIG. 11, the computer device 200 may select an individual object to be recognized as a tangible object 1101 to 1105 based on a <div> tag by parsing web content 1100. If <tag> for a user input, such as the user input object 901 or the input button object 902, is contiguously present within a neighbor area, the contiguous objects may be grouped into a single tangible object 1101 using the <div> tag, that is, a higher classification criterion.

At step 1030, the computer device 200 generates area information, which may correspond to a user input, for each tangible object selected at step 1020 with respect to the web content loaded at step 1010. In other words, the computer device 200 separately generates area information for the user input to the tangible object, that is, area information corresponding to each tangible object included in the web content.

At step 1040, the computer device 200 may apply visual highlighting to the tangible object in exposing the web content loaded at step 1010 through a VR space. The computer device 200 may highlight an area, generated for each tangible object, as an individual object area.

The computer device 200 may recognize the tangible object within the web content in a process of rendering the web content in the VR space, and may display an area for the user input, generated for each tangible object, by visually highlighting the tangible object.

Figure 12:
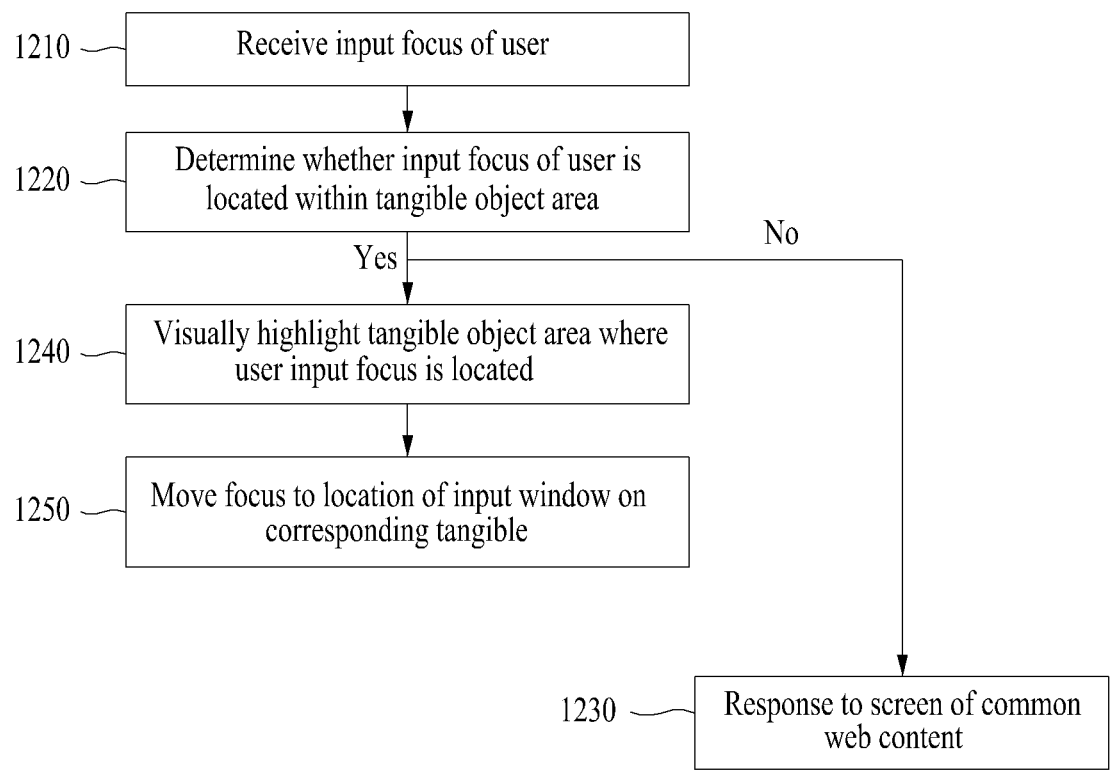
FIG. 12 is a flowchart illustrating an example a focusing movement process on a tangible object according to an embodiment of the present disclosure.

FIG. 12 is a flowchart illustrating an example a focusing movement process on a tangible object according to an embodiment of the present disclosure. The focusing movement process according to the present embodiment may be performed by the computer device 200 that implements a device capable of rendering a space in a virtual world (corresponding to the VR client device 710, the mobile edge computing device 720 or the edge computing device 730 described with reference to FIG. 7).

The computer device 200 may provide a user input environment for web content rendered on a VR space. If an element through which a user's input can be received, such as an input, text, or a select tag, is present in a tangible object, a focusing motion technology on the tangible object is necessary.

At step 1210, the computer device 200 receives an input focus through the input means of a user with respect to web content rendered on a VR space. The computer device 200 may recognize a location of the web content, which is focused by the user, as the input focus of the user.

At step 1220, the computer device 200 determines whether the input focus of the user is located within a tangible object area of the web content. The computer device 200 may recognize on which tangible object the user focuses within the web content rendered on the VR space.

At step 1230, if the input focus of the user deviates from the tangible object area, the computer device 200 may process the corresponding input focus as a response to a screen of common web content.

At step 1240, if the input focus of the user is located within the tangible object area, the computer device 200 may visually highlight the tangible object area where the corresponding input focus is located so that the tangible object area is different from another tangible object.

At step 1250, the computer device 200 may move a focus to a location where the input window of a corresponding tangible object is located through auto-focusing as the input of the user for the input focus is moved within the tangible object area where the input focus of the user is located.

Figure 13:
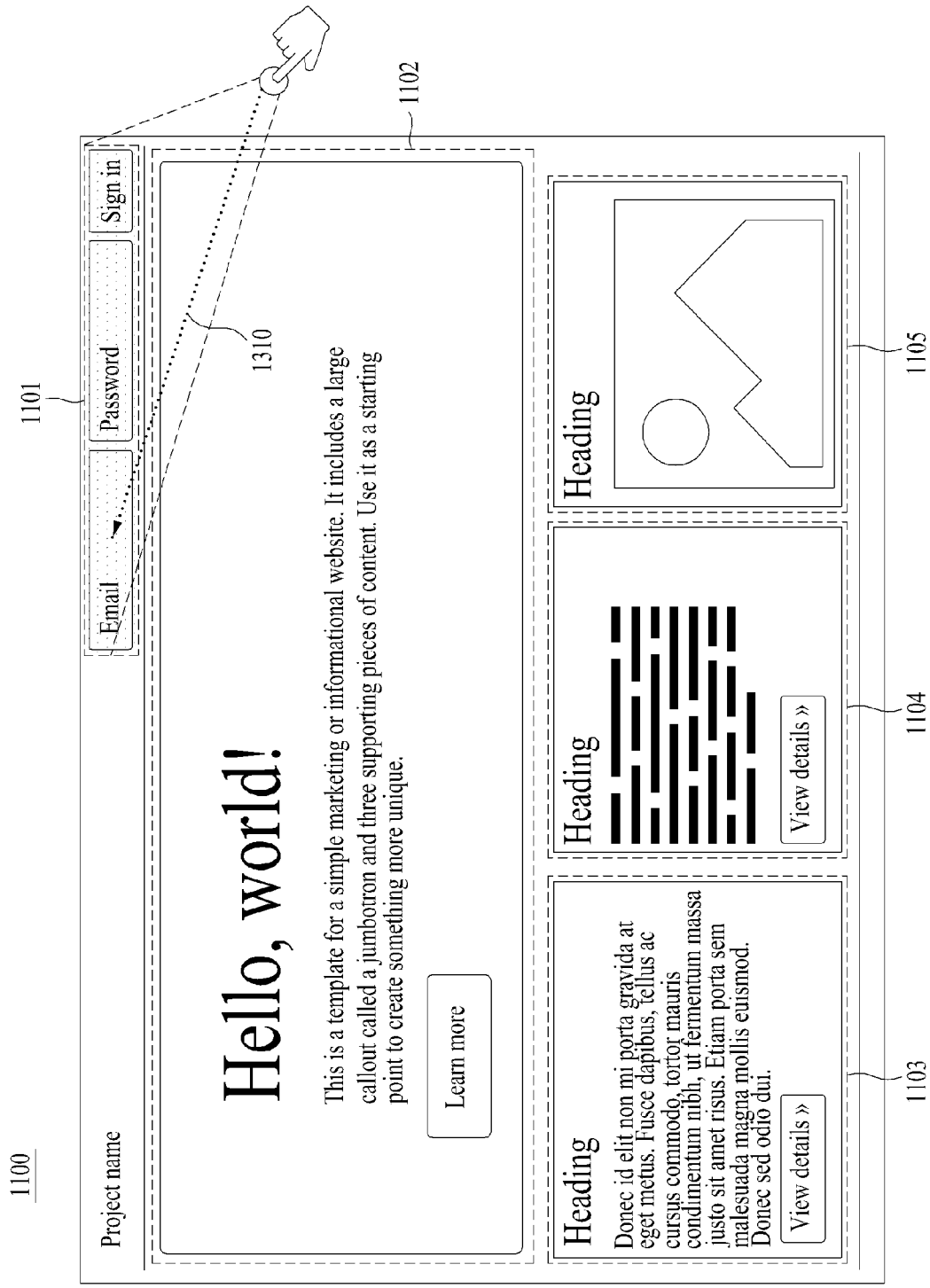
FIGS. 13 to 15 illustrate examples of auto-focusing based on a movement of the input focus of a user according to an embodiment of the present disclosure.

Referring to FIG. 13, if the input focus 1310 of a user for web content 1100 rendered on a VR space is located on any one tangible object 1101, the computer device 200 may highlight the area of the tangible object 1101 so that the tangible object 1101 is distinguished from other tangible objects 1102 to 1105.

Figure 14:
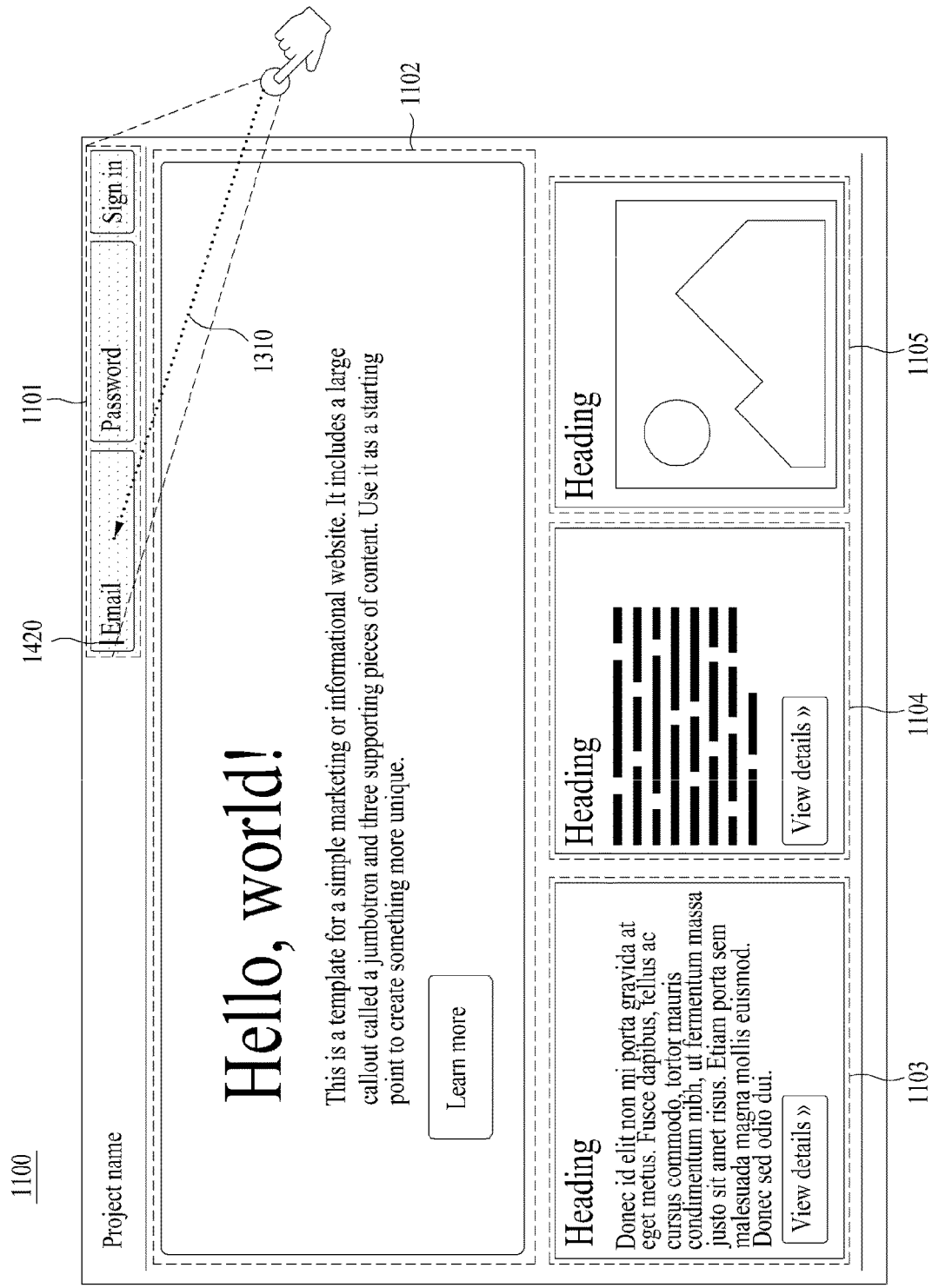
Figure 15:
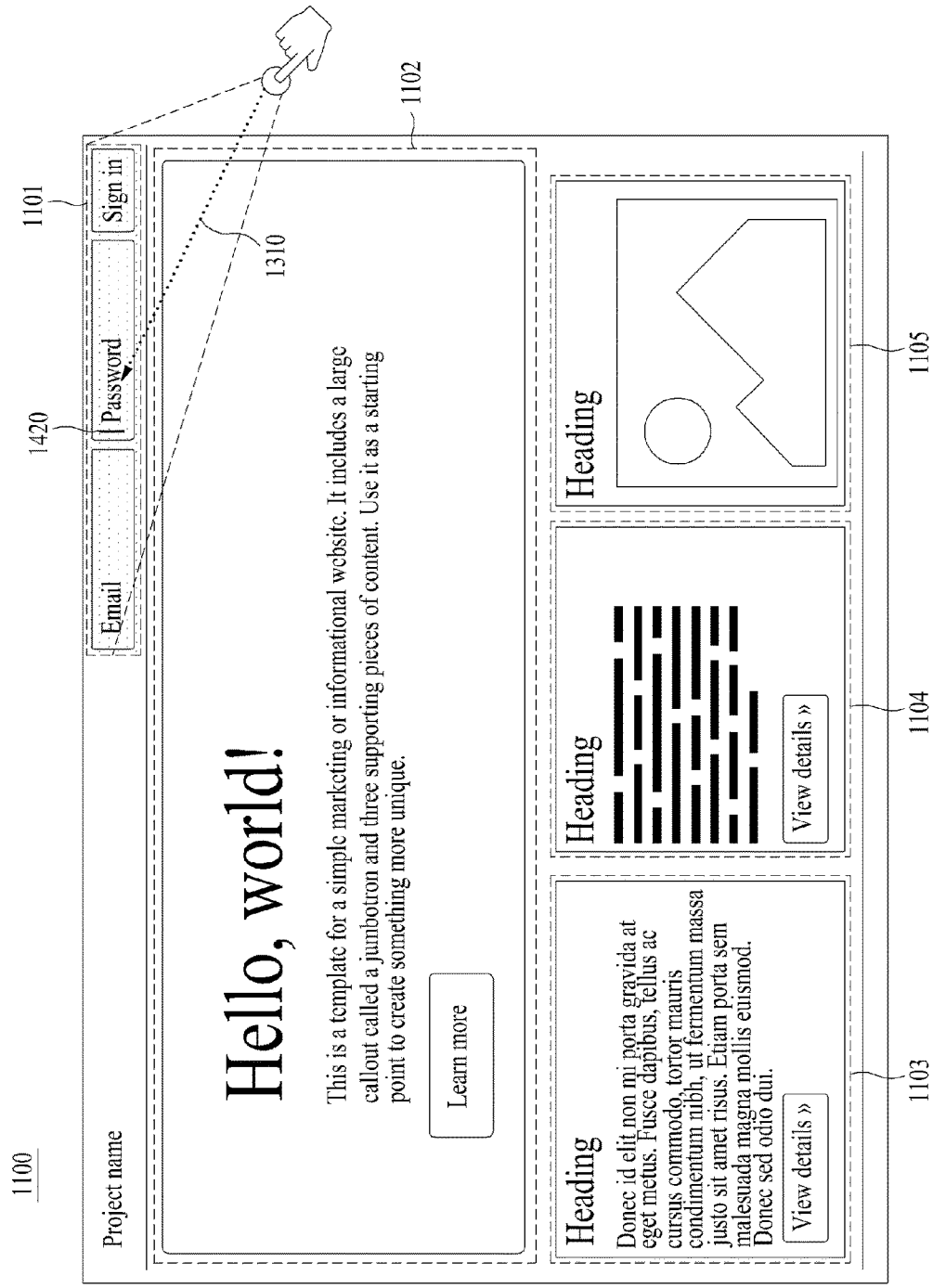

As illustrated in FIGS. 14 and 15, the computer device 200 may move a focus 1420, such as a cursor, to a location corresponding to the input focus 1310 of a user within an input window of a tangible object 1101 through an auto-focusing method in response to a movement of the input focus 1310 of the user.

If plural elements through which a user input, such as an input, text, or a select tag, can be received are present within a tangible object area, auto-focusing may be performed based on an individual object sequence on a code and an individual object location on cascading style sheets (CSS).

In order to determine the sequence of the auto-focusing for the input focus of a user at timing at which content is produced, a separate metadata tag may be used. The metadata tag may designate the priority of an input in an integer value form or describe the priority of the input as relative information, with respect to a tag capable of a user input for each <div> tag or <class> tag.

Furthermore, if a user's input is necessary on a tangible object, an additional function for a user input method may be provided because a user input method, such as using a keyboard, is inconvenient in a VR environment.

The computer device 200 may use a system provision method, such as a virtual keyboard, as a basic input method. The computer device 200 may use a voice input method or a brainwave input method in addition to the virtual keyboard. In some embodiments, if the computer device 200 operates in conjunction with a third party device, an input method using a third party input tool may also be used.

If content provided through a VR environment is segmented, that is, objectified, in a user client stage environment, a publisher who provides web content may be deprived of the opportunity to expose a desired publication format or additional content (e.g., advertising).

Accordingly, the publisher may provide a method for selectively rejecting content from being objectified or sequentially exposing related content. The publisher may previously present whether to support segmentation by providing information on a content exposure method on HTML, such as <vr rendering-option="segment">, <vr rendering-option="no_segment">.

Furthermore, the publisher may also plan and provide, in an object unit, requirements for a publication format, a content exposure method, and additional content for content which may be objectified.

As described above, according to embodiments of the present disclosure, content on the web in a virtual reality environment can be provided in an individual object form not a concept of a window.

The aforementioned apparatus may be implemented in the form of a hardware component, a software component or a combination of a hardware component and a software component. For example, the apparatus and components described in the embodiments may be implemented using one or more general-purpose computers or special-purpose computers, like a processor, a controller, an arithmetic logic unit (ALU), a digital signal processor, a microcomputer, a field programmable gate array (FPGA), a programmable logic unit (PLU), a microprocessor or any other device capable of executing or responding to an instruction. The processor may perform an operating system (OS) and one or more software applications executed on the OS. Furthermore, the processor may access, store, manipulate, process and generate data in response to the execution of software. For convenience of understanding, one processing device has been illustrated as being used, but a person having ordinary skill in the art may understand that the processor may include a plurality of processing elements and/or a plurality of types of processing elements. For example, the processor may include a plurality of processors or a single processor and a single controller. Furthermore, a different processing configuration, such as a parallel processor, is also possible.

Software may include a computer program, code, an instruction or a combination of one or more of them and may configure a processor so that it operates as desired or may instruct the processor independently or collectively. The software and/or data may be embodied in a machine, component, physical device, virtual equipment or computer storage medium or device of any type in order to be interpreted by the processor or to provide an instruction or data to the processor. The software may be distributed to computer systems connected over a network and may be stored or executed in a distributed manner. The software and data may be stored in one or more computer-readable recording media.

The method according to the embodiment may be implemented in the form of a program instruction executable by various computer means and stored in a computer-readable recording medium. The computer-readable recording medium may include a program instruction, a data file, and a data structure solely or in combination. The medium may continue to store a program executable by a computer or may temporarily store the program for execution or download. Furthermore, the medium may be various recording means or storage means of a form in which one or a plurality of pieces of hardware has been combined. The medium is not limited to a medium directly connected to a computer system, but may be one distributed over a network. An example of the medium may be one configured to store program instructions, including magnetic media such as a hard disk, a floppy disk and a magnetic tape, optical media such as CD-ROM and a DVD, magneto-optical media such as a floptical disk, ROM, RAM, and flash memory. Furthermore, other examples of the medium may include an app store in which apps are distributed, a site in which other various pieces of software are supplied or distributed, and recording media and/or store media managed in a server.

As described above, although the embodiments have been described in connection with the limited embodiments and the drawings, those skilled in the art may modify and change the embodiments in various ways from the description. For example, proper results may be achieved although the aforementioned descriptions are performed in order different from that of the described method and/or the aforementioned elements, such as the system, configuration, device, and circuit, are coupled or combined in a form different from that of the described method or replaced or substituted with other elements or equivalents.

Accordingly, other implementations, other embodiments, and the equivalents of the claims belong to the scope of the claims.

What is claimed is:

1. A method performed by a computer device, comprising:
rendering, by at least one processor included in the computer device, web content loaded from a publisher on a virtual reality (VR) space,
wherein the rendering the web content comprises:
selecting an object, having a tangible characteristic and including a plurality of elements configured to receive user input in the web content,
wherein selecting the object comprises selecting the object using a tag breakpoint for an individual object unit;
displaying an area for a user input as an area corresponding to the object; and
providing, by the at least one processor, a focusing movement function within the area corresponding to the object,
wherein the providing the focusing movement function comprises:
moving focus of the user in response to a movement of the input focus of the user, and
auto-focusing one of the plurality of elements based on at least one predetermined metadata tag defining priorities of the plurality of elements to be auto-focused.

2. The method of claim 1, wherein the selecting the object further comprises grouping objects related to the user input into a single object when the objects are contiguously present within neighbor areas.

3. The method of claim 1, wherein displaying the area comprises:
generating area information for the user input for the object; and
highlighting the area corresponding to the object based on the area information.

4. The method of claim 1, wherein the providing the focusing movement function further comprises highlighting the object where an input focus of the user is located among a plurality of objects.

5. The method of claim 1, wherein the providing the focusing movement function further comprises performing auto-focusing based on an individual object sequence on a code or an individual object location on cascading style sheets (CSS).

6. A non-transitory computer-readable recording medium in which a computer program for executing the method according to claim 1 in a computer device is written.

7. A computer device comprising: memory storing computer-readable instructions:
at least one processor,
wherein the at least one processor is configured to execute the computer-readable instructions to:
render web content loaded from a publisher on a virtual reality (VR) space, select an object, having a tangible characteristic and including a plurality of elements configured to receive user input in the web content, wherein the at least one processor selects the object using a tag breakpoint for an individual object unit;

cause a displaying of an area for a user input as an area corresponding to the object; and provide a focusing movement function within the area corresponding to the object wherein the providing the focusing movement function comprises:

moving focus of the user in response to a movement of the input focus of the user, and auto-focusing one of the plurality of elements based on at least one predetermined metadata tag defining priorities of the plurality of elements to be auto-focused.

8. The computer device of claim 7, wherein the at least one processor groups objects related to the user input into a single object when the objects are contiguously present within neighbor areas.

9. The computer device of claim 7, wherein the at least one processor:

generates area information for the user input for the object, and highlights the area corresponding to the object based on the area information.

10. The computer device of claim 7, wherein the at least one processor, performs further auto-focusing based on an individual object sequence on a code or an individual object location on cascading style sheets (CSS).

* * * * *